June 12, 1956  S. D. BLUE  2,749,612
CAN OPENERS
Filed May 16, 1955  3 Sheets-Sheet 1
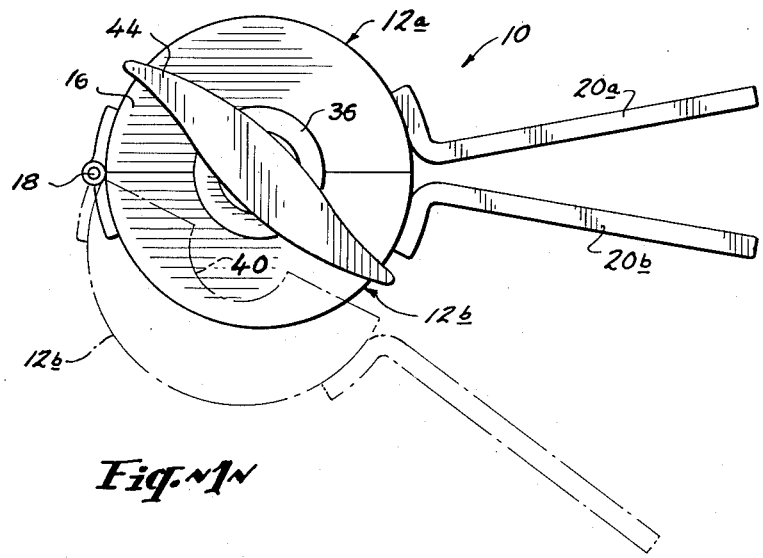
Fig. 1
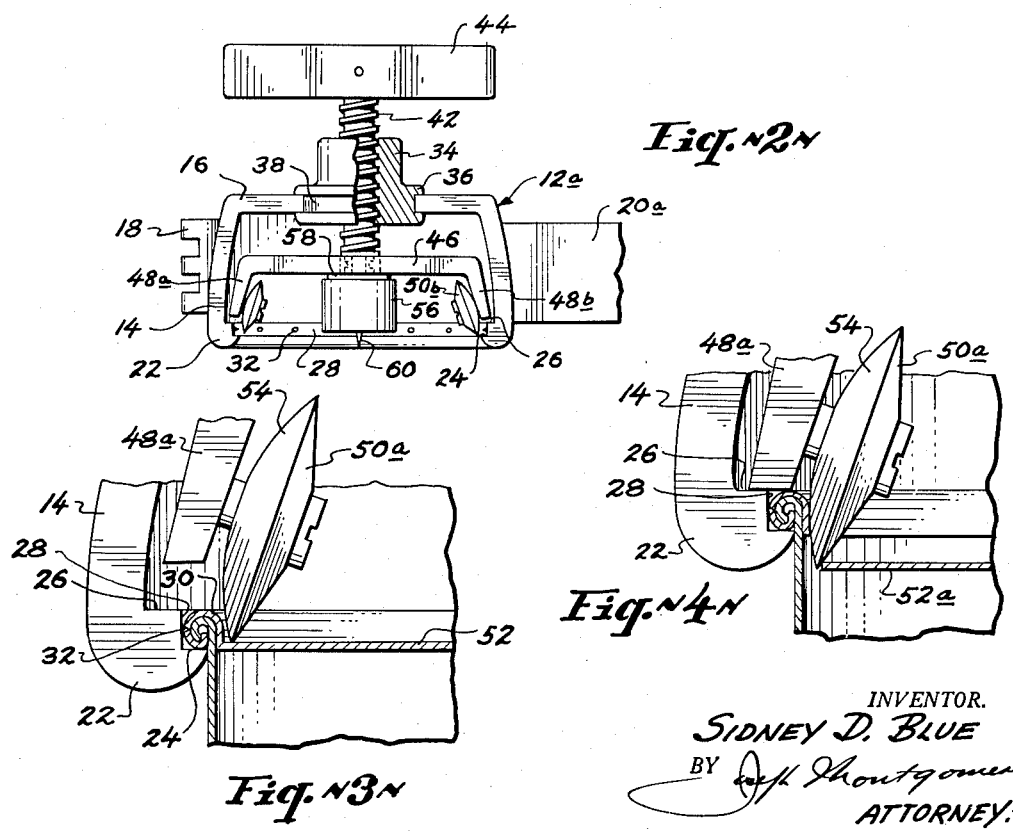
Fig. 2
Fig. 3
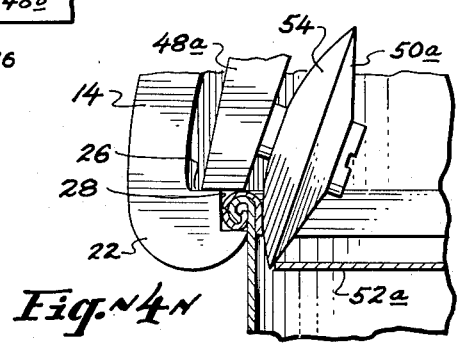
Fig. 4
INVENTOR.
SIDNEY D. BLUE
BY Jeff Montgomery
ATTORNEY.

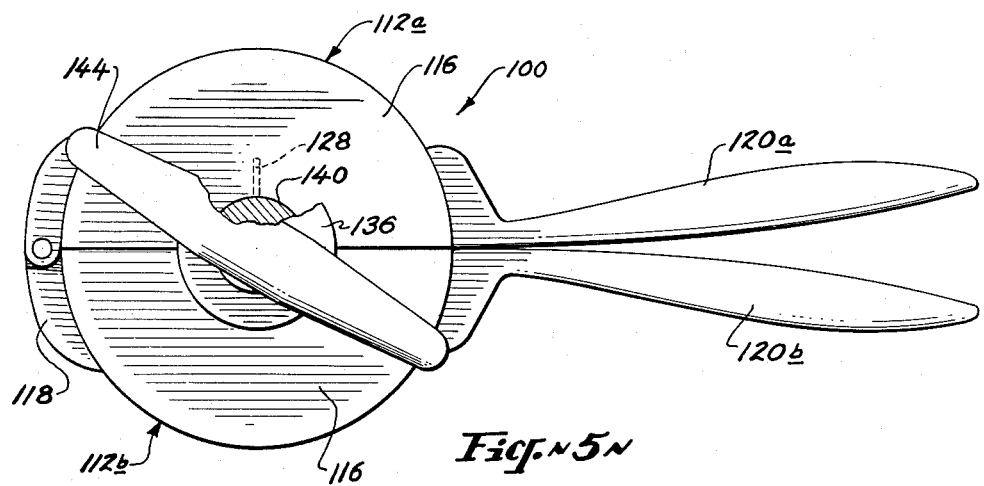
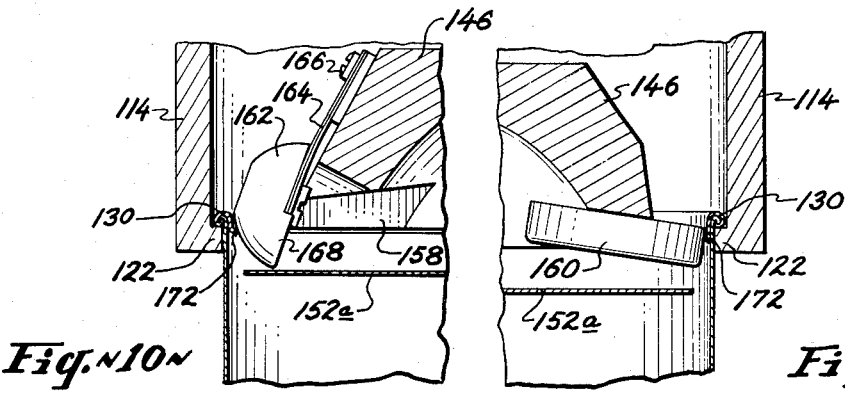
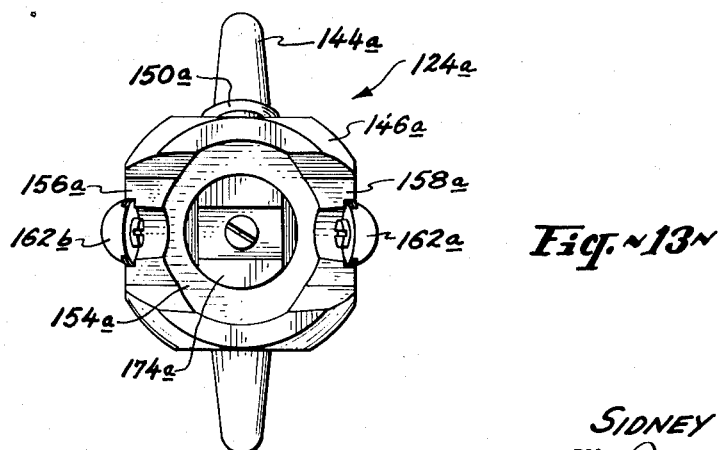

June 12, 1956  S. D. BLUE  2,749,612
CAN OPENERS

Filed May 16, 1955  3 Sheets-Sheet 3

INVENTOR.
SIDNEY D. BLUE
BY *Jack Montgomery*
ATTORNEY.

United States Patent Office 2,749,612
Patented June 12, 1956

2,749,612

CAN OPENERS

Sidney D. Blue, Larchmont, N. Y.

Application May 16, 1955, Serial No. 508,450

13 Claims. (Cl. 30—6.1)

The present invention relates generally to can openers, and is particularly directed to can openers for completely removing the top or lid from sealed cylindrical cans, for example, of the kind usually employed for the packaging of frozen fruit juice, soup or other concentrates, or pre-cooked meats and the like, used in the feeding of infants. This application is a continuation-in-part of the application for United States Letters Patent, Serial No. 469,641, filed November 18, 1954, by Sidney D. Blue, the applicant herein.

With the increasing use of frozen fruit juice or other concentrates and pre-cooked meats and the like for infant feeding, a particular need has been created for a can opener that will efficiently open a can containing either a frozen or other solid mass or a liquid or semi-liquid food in a highly sanitary and convenient manner.

The opening of a can of frozen fruit juice or other concentrate poses a special problem, in that, in order to remove the frozen or semi-frozen contents from the can, it is necessary to sever the lid or top around its entire circumference without leaving any rough or protruding margins or rims on the inside of the wall of the can to impede the removal of the frozen or other solid mass therefrom. Further, it is essential that the severed lid be wholly removed from the can, and the extraction or removal of the lid is complicated by the fact that, following its severance from the side wall of the can, the lid rests against the adjacent end of the frozen, semi-frozen or other solid mass so that it is impossible to tilt the lid, as is frequently done in the case of a can containing a liquid substance, so as to permit the grasping of the raised edge of the severed lid for its removal from the can.

Most existing can openers capable of removing the lid of a can of relatively small diameter, for example, cans of the size containing frozen fruit juice or other concentrates, or pre-cooked meats and the like for infant feeding, require that the operator hold the can firmly in one hand while performing the cutting operation or actuation of the opener with the other hand. However, the grasping of a can containing either a frozen mass or a pre-heated mass, as in the case of meats or other food for infant feeding, results in considerable discomfort to the operator. A further disadvantage of the existing can openers requiring the operator to manually grasp the can during the cutting operation, results from the fact that it is impossible to thereby maintain the can and the cutter in a fixed or uniform relationship to each other during the cutting operation, so that the lid or the can rim, or both, are bent and distorted. With the existing can openers, it is also often necessary to pass over some parts of the periphery of the lid more than once during the cutting operation in order to completely sever the lid from the can. Such repeated cutting frequently results in the tearing of small fragments of metal from the lid or can rim, and such fragments fall into the canned food substance and contaminate the latter.

Even assuming that the operator has successfully opened a can of frozen or other solid food substance with a can opener of the kind now in existence, and has been able to extract the severed lid from the can, the removal of the solid mass from the can still presents a serious problem, since the solid mass acts as a piston or plunger within the cylindrical can, and the weight of the mass is insufficient to overcome both the affinity or friction existing between the mass and the side wall of the can as well as the vacuum or suction created between the closed end of the can and the adjacent end of the solid mass. Under such circumstances, it has usually been necessary to insert a knife blade between the solid mass and the side wall of the can in order to permit the entrance of air therebetween for releasing the above mentioned vacuum.

Accordingly, it is an object of the present invention to provide can openers for cans of the kind containing frozen fruit juice or other concentrates, pre-cooked meats for infant feeding, and the like, which avoid all of the above mentioned disadvantages of the existing can openers useful for such purpose.

More particularly, it is an object of the invention to provide a can opener which is operative to completely sever the top or lid of the can and which leaves both the severed lid and the marginal rim of the can with smooth edges free of any projections or irregularities, thereby making it possible for the user to safely handle the severed lid for disposal and to safely scrape the inside wall of the can with his finger to remove any of the contents which may adhere to the inside of the can.

Another object is to provide a can opener of the described character, wherein the margin portion of the top of the can lying outside of the line along which the lid is severed is folded downwardly into the can to lie against the side wall of the latter so that the cut edge of such marginal portions becomes relatively inaccessible and cannot cut or otherwise injure the user of the can, even when the latter is used as a drinking vessel.

Another object is to provide a can opener for the opening of cans which contain substances under extreme temperatures, for examples, frozen or heated foods, wherein the can is mechanically gripped during the cutting operation thereby to avoid the discomfort associated with the manual grasping of a can containing such food substances.

Another object is to provide a can opener of the described character, wherein the cutting away of any fragments of metal from either the edge of the severed lid or the rim, which fragments can drop into the contents of the can and thereby contaminate the same, is avoided.

A further object is to provide a can opener of the described character, wherein the severed lid is automatically extracted from the can upon the separation of the can opener from the latter.

A still further object is to provide a can opener having all of the above described advantages and characteristics, and which is compact and easily portable so that it may be sterilized, for example, by immersion in boiling water, and then used for the opening of canned baby foods in a sterile manner.

A still further specific object is to provide a can opener of the described character which, following the removal of the top or lid of the can, can be employed for the purpose of puncturing the opposite end wall of the can, thereby to facilitate the removal of a frozen, or other solid mass, from the can by preventing the creation of a vacuum at the end of the can remote from the severed lid.

A still further object of the invention is to provide a can opener of the described character which may be alternatively employed to effect the complete removal of the lid or top of a can containing a solid or liquid food substance or effervescent beverage, or to form, immediately adjacent the rim of the can, two diametrically spaced apart openings in the top of a can containing a liquid, for example, a beverage, so that the liquid contents of the can may then be drunk from or poured through one of such openings, while air enters through the other opening to take the place of the discharged contents, and thereby to facilitate the emptying of the can.

It is a further object of the invention to provide a can opener which embraces the rim of a can to be opened whereby to support the rim throughout its entire circumference so that the rim is held in a fixed position while the can lid is being subjected to the shearing action of a rolling cutting wheel thereby to completely sever the lid without distorting the wall of the can or scoring the outside of the can rim, and thus leaving the rim as a smooth beaded edge, so that, when the can is employed to contain a beverage, the opened can may be safely utilized as a drinking vessel.

Finally, it is an object of the invention to provide a can opener of the described character, wherein the structure provided for normally gripping the can during the opening thereof forms a hood or cover over the open end of the can so that no extraneous matter can drop into the can during the opening of the latter and a shield is formed against the splashing or spraying of the contents of the can when the latter contains effervescent substances.

In accordance with one aspect of the invention, a can opener is provided which includes a housing made up of two generally semi-cylindrical, hingedly connected gripping jaws having handles projecting therefrom to be conveniently held by the operator with the jaws embracing the upper rim of a can to be opened so that rotation of the can, or other movement thereof, with respect to the can opener mechanism is prevented. An internally threaded hub is carried by one of the gripping jaws at a central location, and an actuating screw is threaded through the hub and has a handle on its outer end. A head is secured to the inner end of the actuating screw and, in one embodiment of the invention, is in the form of a diametrically extending bar having rotatable cutting wheels at its opposite ends. In this embodiment of the invention, rotation of the actuating screw in the direction advancing the cutter supporter bar towards the lid of the can causes the cutter wheels to roll along a circular path immediately adjacent the rim of the can and to progressively penetrate the lid for shearing the latter along the circular path. The cutter wheels of this embodiment of the invention are formed so that the outer radial surfaces thereof are convex and project beyond the cutting edges, considered in the radial direction from the axis of rotation of the actuating screw, whereby, as the cutter wheel severs the lid from the rim of the can and rotation of the actuating screw is continued, such convex outer surfaces engage the cut edge of the rim and fold it downwardly against the inside wall surface of the can to form a smooth band or surface within the rim of the can following the severance of the lid. The can opener, in this embodiment of the invention, further includes a pointed element or pin extending axially from the actuating screw between the cutter wheels and operative to initially puncture the lid of the can thereby to ensure the centering of the lid and to prevent the cutting of any fragments of metal from the lid or rim, even when the cutter wheels repeatedly traverse the periphery of the lid. Such pointed pin can also be employed for the purpose of puncturing the end of the can remote from the severed lid thereby to release the vacuum at the punctured end for facilitating the removal of a frozen or other solid mass from the can. Finally, this embodiment of the invention also includes a magnet or the like located centrally between the cutter wheels and operative to secure the severed lid to the cutter supporting bar so that, when the actuating screw is rotated in the direction moving the cutter supporting bar away from the top of the can, the severed lid is carried or extracted from the can and, upon the release of the gripping jaws, the can is conditioned for the removal of the contents therefrom.

In accordance with another aspect of the invention, the hub through which the actuating screw is extended is removable from the gripping jaws so that a screw having a head with a cutter wheel thereon, for completely severing the can lid, can be replaced by an assembly having a head which is rotatable relative to its actuating screw and from which two pointed pins depend to puncture the can lid at diametrically opposed locations when the actuating screw is rotated in the direction advancing the head toward the can lid.

In still another aspect of the invention, the head is in the form of an enclosed housing located within the gripping jaws when the latter are closed upon the rim of a can to be opened, and a cutter wheel is rotatably mounted on the outer periphery of the enclosed housing to roll along a circular path adjacent the rim of the can and to penetrate the lid along that circular path as the head is rotated and advanced toward the lid by suitable rotation of the actuating screw. Further, a roller may be rotatably mounted on the outer periphery of the enclosed housing forming the head at a location diametrically opposed to that of the single cutter wheel for engagement with the lid, thereby to stabilize the latter during the cutting operation. In this aspect of the invention, means independent of the cutter wheel are provided on the head for folding down the marginal cut portion of the top of the can after the lid has been severed. In one embodiment of the invention such means includes a crimping wheel rotatably mounted on the head and projecting beyond the outer periphery of the latter with the axis of the crimping wheel being more or less parallel to the axis of the head, and a resiliently mounted button on the head at a location diametrically opposed to that of the crimping wheel and operative both to condition the marginal cut portion of the top of the can for the action of the crimping wheel and, during the operation of the crimping wheel, to ensure proper contact of the latter with the marginal cut portion. In another embodiment of the invention, the crimping wheel is replaced by a second resiliently mounted button on the rotated head, and the diametrically opposed buttons cooperate to fold down the marginal cut portion at the top of the can and thereby to ensure that, after removal of the severed lid, the inner surface at the open top of the can will be smooth and safe.

In order that the invention may be fully understood, illustrative embodiments thereof are hereinafter described in detail and shown in the accompanying drawings, which form a part hereof, and wherein:

Fig. 1 is a top plan view of a can opener embodying the present invention, with the broken lines representing the position of one of the gripping jaws of the opener relative to the other jaw, when the opener is in its released condition;

Fig. 2 is a side elevational view, partly broken away and in section, of one of the gripping jaws and the associated structure included in the can opener of Fig. 1;

Fig. 3 is a fragmentary detail view, on an enlarged scale, illustrating the operation of the can opener of Figs. 1 and 2 during the severing of the lid of a can;

Fig. 4 is a view similar to Fig. 3, but illustrating the operation of the can opener following the severance of the can lid;

Fig. 5 is a top plan view, partly broken away and in section, of a can opener constructed in accordance with another embodiment of this invention;

Fig. 10 is a fragmentary detail view, similar to Fig. 9, but illustrating the operation of the can opener following the severance of the lid;

Fig. 11 is a view similar to Figs. 9 and 10, but illustrating the operation of the can opener in folding the marginal cut portion at the top of the can following the severance of the lid;

Fig. 13 is a bottom plan view of an assembly corresponding to that shown in Figs. 6, 7 and 8, but constructed in accordance with still another embodiment of this invention.

Figure 6:
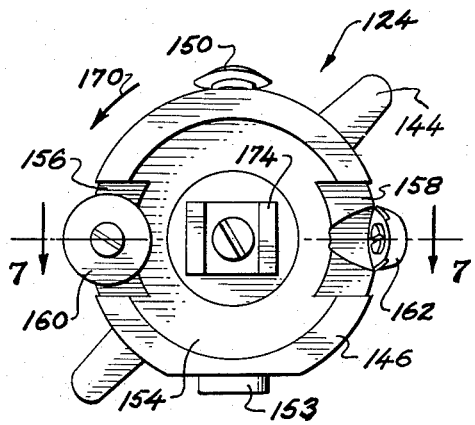
Fig. 6 is a bottom plan view of an assembly that may be included in the can opener of Fig. 5.

Referring to the drawings in detail, and initially to Figs. 1 to 4, inclusive, thereof, a can opener embodying the present invention is there illustrated and generally identified by the reference numeral 10. The can opener 10 includes a housing made up of two complementary gripping jaw members 12a and 12b, each of said jaw members including a side wall 14 of generally semi-cylindrical configuration and a semi-circular top wall 16. The gripping jaw members 12a and 12b are hingedly connected together at one end of their side walls, as by a hinge structure 18, for relative swinging movements between an operative or closed position, wherein they cooperate to define the downwardly opening housing, as shown in full lines on Fig. 1, and an open or released condition, as represented by the broken lines on Fig. 1, wherein the jaw members are angularly separated to permit the insertion and removal of the top portion of a can into and out of, respectively, the space defined within the jaw members. Handles 20a and 20b respectively project from the ends of the jaw members 12a and 12b remote from the hinge structure 18, and preferably diverge slightly, as shown in Fig. 1, when the jaw members are in their closed or operative position, so that the handles 20a and 20b may be simultaneously grasped and urged together by one hand of the operator to maintain the jaw members in their closed position around the top portion of a can.

As seen in Figs. 2, 3, and 4, the lower edge of the side wall 14 of each of the gripping jaw members is thickened or enlarged radially inward to form a lower rim 22, and the inner surface of the rim 22 is stepped to define two annular, upwardly facing shoulders 24 and 26, at different levels, and a cylindrical surface 28 facing radially inward and extending between the shoulders 24 and 26.

The inner diameter of the rim 22, with the jaw members in their closed or operative position, is approximately equal to the outer diameter of the side wall of the can to be opened, while the diameter of the cylindrical surface 28 is approximately equal to the outer diameter of the rim 30 at the upper end of the can. Thus, when it is desired to position the jaw members 12a and 12b on a can to be opened, the jaw members are angularly separated and placed over the upper end of the can and are then brought together, to the operative position of Fig. 1, with the shoulder 24 underlying the rim 30 of the can (Figs. 3 and 4) and with the surface 28 closely engaging around the rim 30.

In order to prevent rotation of the can relative to the jaw members 12a and 12b in their operative or closed position, the cylindrical surface 28 is preferably provided with radially inward directed projections 32 which, in the embodiment of the invention shown in Figs. 1 to 4, inclusive, are in the form of pointed pins which press into the rim 30 of the can to securely hold the latter so long as the handles 20a and 20b are urged together. It is apparent that the structure described above forms, in effect, a pair of gripping tongs, whereby a can to be opened and containing a frozen or heated food product may be picked up, transported or otherwise manipulated without requiring the manual grasping of the can.

In the can opener 10 embodying this invention, the top wall 16 of one of the gripping jaw members, the jaw member 12a in the illustrated example, has an internally threaded boss or hub 34 suitably secured thereto at a location which is concentric with the side wall 14 of the related jaw member. The boss 34 has a radially extending circular flange 36 at the bottom thereof formed with an annular, peripheral groove 38 (Fig. 2) opening radially outward to receive the inner edge portion of the top wall of jaw member 12b defining a semi-circular cut-out 40 which is shown in broken lines on Fig. 1. Thus, the flange 36 provides a separable coupling between the jaw members 12a and 12b when the latter are in their operative or closed position, and which prevents relative shifting of the jaw members due to any clearance or play in the hinge structure 18.

An actuating screw or threaded shaft 42 is axially threaded through the hub 34 and, at its upper or outer end, carries an actuating handle 44 by which the screw may be manually rotated. At its lower or inner end, the screw 42 has a head rigidly secured thereto, such head being in the form of a cutter carrying bar 46 in the can opener 10. The bar 46 extends diametrically with respect to the axis of rotation of screw 42 and, at its opposite ends is bent downwardly, as at 48a and 48b. Rotatable cutter wheels 50a and 50b are mounted on the downwardly bent ends 48a and 48b, respectively, with their planes of rotation converging upwardly at the same angle with respect to the axis of rotation of the screw 42. The cutter wheels 50a and 50b are spaced radially from the axis of rotation of the actuating screw by exactly the same distances, the diametrical distance between the peripheral cutting edges of the wheels being oly slightly less than the inner diameter of the rim 22, so that, as the screw 42 is rotated, both cutter wheels follow the same circular path and are moved downwardly or upwardly relative to the housing formed by the jaw members 12a and 12b, depending upon the direction of rotation of the actuating screw.

As seen in Fig. 3, when a can to be opened is embraced by the jaw members 12a and 12b with its rim 30 engaged in the annular recess defined by the shoulder 24 and the surface 28, rotation of the screw 42 in the direction effecting axial advancement thereof toward the top or lid 52 of the can causes the cutter wheels 50a and 50b to come into contact with the top or lid 52 at locations immediately adjacent the inside of the can rim 30, and continued rotation of the screw 42 in the same direction causes the cutter wheels to roll along a circular path on the lid 52 and to progressively penetrate through the latter and thereby sever the portion of the lid 52 enclosed within the circular path.

In the embodiment of the invention illustrated in Figs. 1 to 4, inclusive, the cutter wheels 50a and 50b are arranged at the inside of the related downwardly bent ends 48a and 48b of the cutter carrying bar, and the bar 46 is dimensioned so that the downwardly bent ends thereof are engageable with the shoulder 26 on the lower rim of the housing (Fig. 4) thereby to limit the downward displacement of the cutter wheels.

In the can opener 10, the radial surface 54 of each cutter wheel facing away from the axis of screw 42 is convex and projects beyond the cutting edge of the related wheel in the radial direction considered from the axis of rotation of the screw (Figs. 3 and 4). Thus, after the cutter wheels have penetrated the top or lid 52 of the can along a circular line adjacent the rim 30 thereof, continued downward movement of the cutter wheels by rotation of the screw 42 causes the convex outer surface 54 of the cutter wheels to engage the sharp cut edge or marginal portion extending radially inward from the rim 30 and to fold this cut edge downwardly against the inner side wall surface of the can, in the manner shown in Fig. 4, so that the inside surface of the rim is thereby smoothed, and the severed portion 52a of the lid may be easily extracted from the can without interference from the cut edge of the rim. Further, the downward folding of the cut edge on the rim 30 avoids any possibility that such edge may thereafter interfere with the removal of the contents of the can, particularly when such contents are either frozen or otherwise solidified. It is also apparent that the downward folding of the cut edge on the rim 30 makes the can, from which the lid has been severed, suitable for use as a drinking vessel, since the cut edge at the top of the can can no longer cut or otherwise injure the user.

In order to provide for the automatic extraction of the severed portion 52a of the top or lid from the can, the cutter carrying bar 46 of the can opener 10 supports a centrally located member which is adapted to adhere to the severed portion of the lid so that, when the screw 42 is rotated in the direction moving the bar 46 axially upward, the severed portion of the lid is carried along by such member and extracted from the remainder of the can to condition the latter for the removal of its contents upon the release of the jaw members 12a and 12b. In the embodiment of the invention described above and shown particularly in Fig. 2, the member for adherence to the severed portion of the can lid is in the form of a strong permanent magnet 56 depending from the bar 46 in axial alignment with the screw 42 and preferably mounted so that it is capable of rotation relative to the bar 46. The lower surface of magnet 56 is arranged to come into contact with the top or lid 52 of the can immediately after the latter has been severed by the cutter wheels 50a and 50b. In order to avoid dissipation of the magnetic field, a non-magnetic washer 58 may be interposed between the magnet 56 and the bar 46. Thus, when the lid or top of the can is severed, the severed portion 52a adheres to the magnet 56 and is thereby prevented from falling into the contents of the opened can, and when the rotation of the actuating screw 42 is reversed to raise the cutter bar 46, the magnet 56 also moves upwardly and carries with it the severed portion 52a of the lid.

The magnet 56 of the can opener 10 is provided with a pointed pin 60 (Fig. 2) depending centrally therefrom and adapted to puncture the can top or lid 52 prior to the engagement of the cutter wheel with the latter. The pin 60 positively locates the top or lid of the can relative to the circular path of the cutter wheels 50a and 50b so that the latter cut along the same circular line on the lid during the repeated or continuous rotation of screw 42, thereby to avoid cutting away of any fragments of metal from the periphery of the severed portion of the lid or from the marginal cut portion extending from the rim 30.

The pin 60 is capable of performing still another function by reason of its projection below the level of the peripheral cutting edges of the cutter wheels 50a and 50b. Thus, if after the removal of the top or lid of the can, difficulty is experienced in removing the frozen or other solid contents of the can by reason of the vacuum created between the closed end of the can and the adjacent end of the frozen or solid mass, the can may be inverted over a suitable receptacle, and, with the jaw members 12a and 12b gripping the lower end of the can, which is then uppermost, the screw 42 is rotated until the pointed pin 60 punctures the bottom of the can thereby to release the vacuum and permit the contents of the can to fall into the underlying receptacle.

Referring now to Figs. 5 to 12, inclusive, a can opener constructed in accordance with another embodiment of this invention is there illustrated and generally identified by the reference numeral 100. As in the first described embodiment, the can opener 100 includes a housing made up of two complementary gripping jaw members 112a and 112b, each of said jaw members including a side wall 114 (Figs. 9 to 12) of generally semi-cylindrical configuration and a semi-circular top wall 116 which, at its periphery, is curved downwardly and integral with the related side wall.

The gripping jaw members 112a and 112b are hingedly connected together at one end of their side walls, as by a hinge structure 118 (Fig. 5), for relative swinging movement between an operative or closed position, wherein they cooperate to define the downwardly opening housing, and an open or released condition, wherein the jaw members are angularly separated to permit the insertion and removal of the top portion of a can into and out of, respectively, the space defined within the jaw members. Handles 120a and 120b respectively project from the ends of the jaw members 112a and 112b remote from the hinge structure 118 and preferably diverge slightly, as shown in Fig. 5, when the jaw members are in their closed or operative position, so that the handles may be simultaneously grasped and urged together by one hand of the operator to maintain the jaw members in their closed position.

As seen in Figs. 9 to 12, inclusive, the lower edge of the side wall 114 of each of the gripping jaw members is thickened or enlarged radially inward to form a lower rim 122, and the inner diameter of that rim, with the jaw members in their closed position, is approximately equal to the outer diameter of the side wall of the can to be opened, while the diameter of the inner cylindrical surface of the side wall 114 is approximately equal to the outer diameter of the rim 130 at the upper end of the can. Thus, when it is desired to clamp a can to be opened within the jaw members 112a and 112b, the latter are first angularly separated and placed over the upper end of the can and are then brought together, to the operative position shown in Fig. 5, with the rim 122 underlying the rim 130 of the can.

In order to prevent rotation of the can relative to the jaw members 112a and 112b in their operative position, the inner surface of each of the jaw members is preferably provided with radially inward directed projections or ridges extending axially immediately above the rim 122 at locations which are substantially centrally disposed with respect to the opposite ends of the side wall 114. It is apparent that the ridges 132 may be formed integral with the related jaw member, particularly when the latter is in the form of a metal casting. It is apparent that the ridges 132 will be pressed against the rim 130 of a can when the jaw members are urged together over the latter. The jaw members 112a and 112b, the hinged connection 118 therebetween, and the handles 120a and 120b form, in effect, a pair of gripping tongs, whereby a can to be opened and containing either a frozen or heated food product may be picked up, transported or otherwise manipulated without requiring the manual grasping of the can.

The can opener 100 is completed by one or the other of two assemblies 124 (Figs. 6, 7 and 8) and 126 (Fig. 12) which are interchangeable and respectively operative to sever and remove the top or lid of a can grasped by the jaw members, and to form or punch two diametrically opposed openings in the top of the can.

As seen in the drawings, each of the assemblies 124 and 126 includes an internally threaded boss or hub 134 having a radially extending circular flange 136 at the lower end thereof which is formed with a peripheral, radially opening groove 138. The top walls 116 of the jaw members 112a and 112b are formed with complementary, semi-circular cut-outs 140 so that the inner edges of the top walls 116 around the cut-outs 140 will engage in the groove 138 of the flange 136 when the jaw members are brought to their closed position. Further, the flange 136 of the hub of each assembly has a radially extending, tapered pin 128 which is adapted to be received in a suitable radial bore formed in the top wall 116 of one of the jaw members and opening at the edge of the related cut-out 140. Thus, when the jaw members 112a and 112b are angularly separated, the tapered pin 128 will serve to hold the hub 134 in engagement with one of the jaw members. However, the hub 134 may be disassembled from the jaw member having the bore in which the tapered pin 128 is received, merely by pulling the hub 134 radially away from that jaw member. When the jaw members are in their closed position (Fig. 5) with the inner edges of their top walls engaging in the groove 138 of the assembly 124 or 126 then associated with the jaw members, the grooved flange 136 of the hub provides a separable coupling between the jaw members to prevent relative shifting of the latter due to any clearance or play in the hinge structure 118.

Further, each of the assemblies 124 and 126 includes a shaft 142 which is threaded over at least a substantial portion of its length and extends threadably through the hub 134. Each shaft 142 has an actuating handle 144 secured to its upper or outer end and by which the shaft may be manually rotated.

Figure 7:
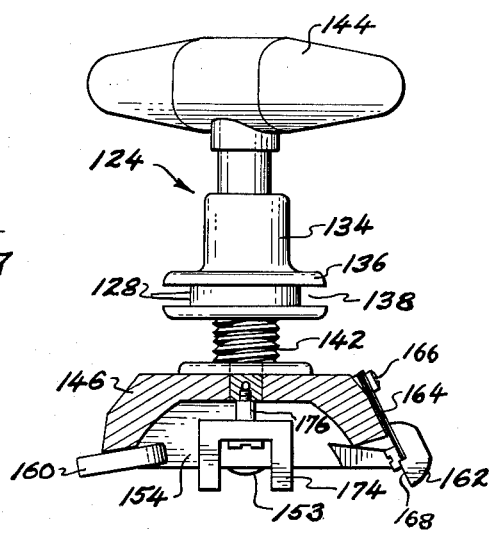
Fig. 7 is a sectional view taken along the line 7—7 of Fig. 6.
Figure 8:
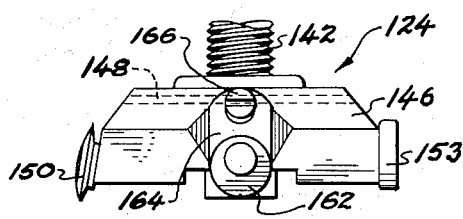
Fig. 8 is a partial, side elevational view of the assembly of Figs. 6 and 7, but viewed in the direction at right angles to the plane of the section in Fig. 7.

As seen in Figs. 6, 7 and 8, the assembly 124 includes a generally circular head 146 which is rigidly secured to the lower end of the actuating shaft 142, for example, by a pin 148 extending diametrically through aligned bores in the head 146 and the lower end portion of shaft 142 and shown in broken lines on Fig. 8. A single cutter wheel 150 (Figs. 6 and 8) is rotatably mounted on the outer periphery of the head 146, and the axis of rotation of the cutter wheel 150 is arranged so that the peripheral cutting edge of the latter extends below the lower edge of the head 146 and the plane of rotation of the cutter wheel is inclined to converge upwardly with respect to the axis of rotation of the shaft 142. The angle at which the plane of rotation of the cutter wheel 150 is inclined and the configuration of the outer radial surface of the cutter wheel are such that the cutting edge of the wheel 150, at the bottom thereof, is at least as far from the axis of rotation of the shaft 142 as any other portion of the outer radial surface of the cutter wheel.

Figure 9:
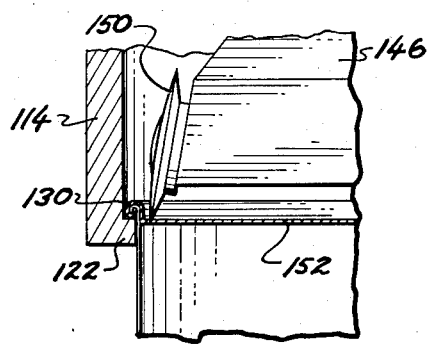
Fig. 9 is a fragmentary detail view, on an enlarged scale, illustrating the operation of the can opener of Fig. 5 during the severing of the lid of a can.

As seen in Fig. 9, rotation of the shaft 142 of the assembly 124 in the direction causing movement of the head 146 toward the top or lid 152 of a can grasped by the jaw members 112a and 112b will cause the cutter wheel 150 to follow a circular path on the top or lid 152 adjacent the rim 130 of the can. Continued rotation of the shaft 142 in the same direction will cause the cutter wheel 150 to penetrate or cut through the top or lid 152 along the above mentioned circular path, so that a circular portion 152a of the top or lid will be severed from the remainder of the can.

If desired, as shown in Figs. 6 and 8, a stabilizing roller 153 may be rotatably mounted on the outer periphery of the head 146 at a location diametrically opposed to that of the cutter wheel 150, and the stabilizing roller 153 is preferably arranged with its axis of rotation extending normal to the axis of rotation of the shaft 142 and positioned so that the periphery of the roller 153 extends below the lower edge of the head 146 a distance slightly less than the projection of the peripheral cutting edge of the wheel 150. Further, the stabilizing roller 153 is preferably arranged on a flattened portion of the outer periphery of the head (Fig. 6) so that, as the head 146 is rotated, the stabilizing roller follows a circular path lying radially inside of the circular path followed by the cutter wheel 150 and engages the severed portion of the lid to prevent tilting or raising up of the latter in response to the downward shearing force of the cutter wheel 150 at a diametrically opposed location on the lid.

As seen in Fig. 6 and 7, the head 146 has a downwardly opening recess or hollow 154 and cut-outs 156 and 158 in its lower edge at diametrically opposed locations which are angularly displaced through 90 degrees from the diametrical line extending between the cutter wheel 150 and the stabilizing roller 153. The cut-outs 156 and 158 open downwardly and also radially from the hollow 154 to the outer peripheral surface of the head 146.

In order to fold down the marginal cut portion of the top or lid 152 extending from the rim 130 of the can following the severance of major portion 152a of the lid 152 by the cutter wheel 150, the assembly 124 of the can opener 100 includes a crimping wheel 160 which is rotatably mounted on the head 146 within the cut-out 156. The crimping wheel 160 is arranged with its axis of rotation converging slightly in a downward direction with respect to the axis of rotation of the threaded shaft 142 (Fig. 7) and with its periphery projecting radially outward beyond the outer surface of the head 146.

Mounted on the outside of the head 146 adjacent the cut-out 158 of the latter, that is, at a location diametrically opposed to the crimping wheel 160, is a button 162 (Figs. 6, 7, 8 and 10). As seen in the drawings, the button 162 is of generally semispherical configuration and is mounted upon one end of a leaf-spring 164 which, at its other end, is secured to the outer surface of the head 146, as by the screw 166. The button 162 is held against rotation relative to the spring 164, for example, by a lip 168 on the button (Fig. 10) which, at its opposite ends, its engageable with the longitudinal side edges of the leaf-spring 164.

The thread on the shaft 142 is arranged so that, when the shaft is rotated in the direction for advancing the head 146 toward the top or lid 152 of a can grasped by the jaw members 112a and 112b, the button 162 will immediately follow the cutter wheel 150 to perform its respective function, which is hereinafter described in detail, immediately after the cutter wheel has served to cut through the top or lid of the can. Thus, as viewed in Fig. 6, the rotation of the head 146 causing its movement toward the top or lid of the can will be in the counter-clockwise direction, as indicated by the arrow 170. Further, the cramping wheel 160 and the button 162 are arranged relative to each other so that, as rotation of the head 146 in the direction of the arrow 170 continues after the cutter wheel 150 has severed a major circular portion 152a of the can top or lid, the button 162 will engage the marginal cut portion or edge extending radially inward from the rim 130 of the can before the crimping wheel 160 comes into a position of engagement with that cut edge. Thus, as shown in Fig. 10, the button 162 resiliently engages the cut edge or marginal portion 172 after severing of the portion 152a of the lid and starts the downward bending of the cut edge or marginal portion 172 to condition the latter for the subsequent action of the crimping wheel. Thereafter, the crimping wheel 160 engages the marginal cut portion 172, as shown in Fig. 11, and completes the downward folding of the marginal portion so that the latter then lies against the inside wall surface of the can. During the action or operation of the crimping wheel 160, the button 162 continues to engage the marginal cut portion of the can at a location diametrically opposed to the point of contact of the crimping wheel with the marginal cut portion and thereby ensures proper radially outward pressure of the crimping wheel against the part of the marginal cut portion with which it is engaged.

In order to prevent the severed portion 152a of the can top or lid from falling into the contents of the can, the assembly 124 further includes a strong permanent magnet 174 (Figs. 6 and 7) which is mounted within the hollow or recess 154 of the head 146 and which is capable of axial, as well as rotational, movement relative to the head. As seen in Fig. 7, such mounting of the magnet 174 may be achieved by a screw 176 having a small diameter threaded end which is received in a tapped, downwardly opening bore at the lower end of the shaft 142 so that the head of screw 176 is spaced substantially from the roof of the hollow 154. The magnet 174 is U-shaped and, at its center, is provided with an aperture through which the screw 176 loosely extends. The thickness of the central portion of the magnet 174 is less than the distance between the head of the screw 176 and the roof of the hollow or recess 154. The screw 176 and magnet 174 are dimensioned so that normally the legs of the magnet will project downwardly beyond the peripheral cutting edge of the cutter wheel 150. Thus, as the shaft 142 is rotated in the direction for advancing the head 146 toward the top or lid of a grasped can, the magnet 174 will contact and adhere to the lid of the can before the cutter wheel 150 engages the top or lid 152. As the head 146 continues its advance toward the lid 152 thereby to cause the cutter wheel to penetrate and shear the lid along a circular path, the severed portion of the lid will adhere to the magnet 174, and the magnet will remain non-rotatable and move upwardly on the non-threaded portion of the screw 176 until such time as the top or lid is completely severed. After the lid has been completely severed, the magnet 174 will again be suspended from the head of the screw 176 with the severed portion 152a of the can top or lid adhering to the magnet. Thus, when the rotation of the shaft 142 is reversed, to cause movement of the head 146 in the direction away from or out of the can, the severed portion of the lid will be carried along by the magnet and removed from the can with the opener 100 upon the release of the jaw members 112a and 112b.

Figure 12:
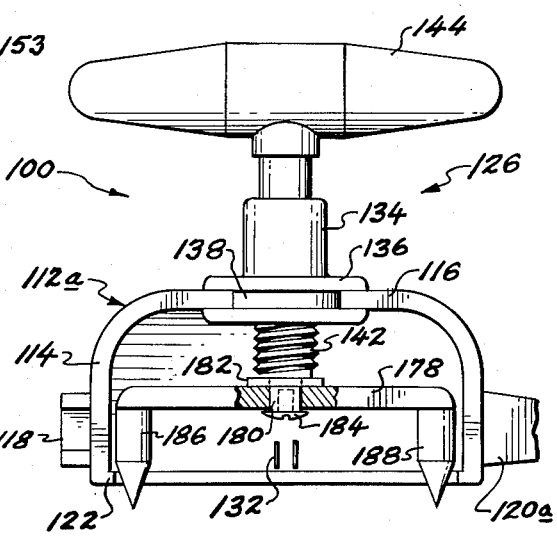
Fig. 12 is a partial, side elevational view of one of the gripping jaws of the can opener of Fig. 5, but with a hole punching assembly substituted for the assembly illustrated in Figs. 6, 7 and 8.

When the user of the can opener 100 wishes merely to form holes in the top of a can containing a liquid, for example, a beverage or the like, the assembly 124, which is used for effecting complete severance of the top or lid of the can, is removed from its operative position on the jaw members and is replaced by the assembly 126 (Fig. 12). The assembly 126 includes a bar 178 which extends diametrically at the lower end of the related threaded shaft 142 and which is mounted on the latter so as to be free to rotate with respect to the shaft 142. In order to permit such rotation of the bar 178 relative to the threaded shaft 142, the latter is provided with a reduced diameter lower end portion 180 extending loosely through a suitable centrally located aperture in the bar 178, and the bar 178 is confined between a washer 182 and the head of a screw 184 threaded into a suitable tapped bore opening downwardly at the lower end of the reduced diameter portion 180.

At its opposite ends, the bar 178 has fixed, depending pointed pins 186 and 188 so that, as the threaded shaft 142 is rotated in the direction advancing the bar 178 axially toward the top or lid of a can grasped by the jaw members 112a and 112b, the pointed pins 186 and 188 will penetrate the top or lid of the can to provide two diametrically spaced apart openings therein.

The arrangement of the jaw members 112a and 112b to form a roofed or closed housing over the top of a can embraced thereby is advantageous, in that such closed housing prevents the splashing or spraying of the contents of the can opened with the can opener 100. This feature is of particular importance when the assembly 126 is used to form two openings in the top or lid of a can containinging an effervescent liquid or beverage.

Referring now to Fig. 13 of the drawings, an assembly corresponding to the previously described assembly 124, but constructed in accordance with another embodiment of this invention, is there illustrated and generally identified by the reference numeral 124a. The assembly 124a is used in the same manner as the above described assembly 124 in connection with a pair of jaw members as illustrated in Fig. 5 and includes a head 146a which is secured to the lower end of a threaded shaft (not shown) having a handle 144a at its upper end. The head 146a has a downwardly opening hollow or recess 154a and cut-outs 156a and 158a at diametrically opposed locations in its lower edge opening downwardly and radially outward from the hollow or recess 154a. A single cutter wheel 150a is mounted on the peripheral outer surface of the head 146a at a location which is angularly displaced 90 degrees from the diametrical line extending through the cut-outs 156a and 158a and acts in the same manner as the cutter wheel 150 of the assembly 124. As in the assembly 124, a button 162a is mounted resiliently on the head 146a at the location of the cut-out 158a, while the crimping wheel 160 of the previously described embodiment is replaced by a second button 162b which is resiliently mounted on the outer periphery of the head 146a at the location of the cut-out 156a, that is, at a position diametrically opposed to the location of the button 162a. Further, as in the previously described embodiment, a permanent magnet 174a is mounted within the hollow or recess 154a of the head 146a and is capable of both axial and rotational movements with respect to the latter. In addition to the replacement of the crimping wheel 160 by a second resiliently mounted button 162b, the assembly 124a is distinguished from the previously described assembly 124 by the absence of a stabilizing roller at a location diametrically opposed to that of the cutter wheel 150a.

The assembly 124a operates in substantially the same manner as has been described in connection with the assembly 124, except that the diametrically opposed, resiliently mounted buttons 162a and 162b are relied upon to complete the downward folding of the marginal cut portion extending from the rim of a can following the severance of a substantial portion of the lid of the can from the rim thereof.

From the foregoing description of can openers embodying this invention, it is apparent that such can openers permit the opening of cans having frozen or heated contents with a minimum of handling of the can. Thus, the jaw members and their associated handles may be employed as carrying tongs for transporting the can to be opened from a freezer or pot of boiling water, depending upon the contents of the can, and the actuating handle may then be rotated, first in one direction and then in the other, to effect the severence and extraction of the can lid, the entire procedure being carried out without the necessity of manually grasping the can of frozen or heated food substance. Further, it is apparent that the entire can opener, which is preferably made of rust-proof metal and other similarly resistant materials, may be adequately washed or even sterilized so that, for example, the opening of canned baby foods therewith may be performed in a completely sanitary manner.

Since the can is firmly gripped by the jaw members during the cutting operation, the circular path followed by the cutter wheel or wheels is positively established so that the top or lid of the can is smoothly severed thereby to avoid the rough or jagged edges frequently resulting from the operation of existing can openers. It is also to be noted that during non-use the head carrying the cutter wheel or wheels or lid puncturing pins may be retracted to a position completely within the jaw members so that the can opener may be handled safely, without the danger of sustaining cuts by reason of contact with the cutter wheels, and the cutter wheels will be protected against nicks and other damages by reason of contact thereof with other utensils.

While specific illustrative embodiments of the invention have been described in detail herein and shown in the accompanying drawings, it is to be understood that the invention is not limited to such precise embodiments, and that various changes and modifications may be effected therein without departing from the scope or spirit of the invention as defined in the appended claims.

What is claimed is:

1. A can opener comprising a downwardly opening, diametrically split housing including two semi-cylindrical roofed portions hingedly connected at one side for swinging between an angularly spaced apart released position and a closed position, wherein said portions are abutting to embrace and extend over the top of a can to be opened, said housing further having an inwardly directed rim along its lower edge to engage under the rim at the top of a can embraced by said housing; and an assembly including an internally threaded hub adapted to be carried by said housing, a threaded shaft extending through said hub for movement axially toward and away from the top of a can embraced by said housing in response to rotation of said threaded shaft in opposite directions relative to said housing, at least one rotatable cutter wheel, and means mounting said cutter wheel on said shaft at a location spaced radially from the axis of the latter to roll along a circular path and progressively penetrate through the top of a can embraced by said housing as said threaded shaft is rotated in the direction advancing the latter axially toward the top of the can, said inwardly directed rim serving to support the rim of the can while the cutter wheel penetrates through the top of the can.

2. A can opener comprising a downwardly opening, diametrically split housing including two semi-cylindrical roofed portions hingedly connected at one side for swinging between an angularly spaced apart released position and a closed position, wherein said portions are abutting to embrace and extend over the top of a can to be opened, said housing further having an inwardly directed rim along its lower edge to engage under the rim at the top of a can embraced by said housing; and an assembly including an internally threaded hub adapted to be carried by said housing, a threaded shaft extending through said hub for movement axially toward and away from the top of a can embraced by said housing in response to rotation of said threaded shaft in opposite directions relative to said housing, a pair of rotatable cutter wheels, and means mounting said cutter wheels on said shaft at diametrically opposed locations spaced equally from the axis of said shaft so that said cutter wheels roll along a single circular path and progressively penetrate through the top of a can embraced by said housing as said shaft is rotated in the direction advancing the latter axially toward the top of the can, said inwardly directed rim serving to support the rim of the can while the cutter wheels penetrate through the top of the can.

3. A can opener comprising a downwardly opening, diametrically split housing adapted to embrace and extend over the top of a can to be opened; and an assembly including an internally threaded hub adapted to be carried by said housing, a threaded shaft extending through said hub for movement axially toward and away from the top of a can embraced by said housing in response to rotation of said threaded shaft in opposite directions relative to said housing, a head on the end of said shaft within said housing, and means on said head operative, when said shaft is rotated in the direction advancing said head axially toward the can top, to sever the latter along a circular path adjacent the periphery of the can top and to fold the marginal cut portion outside of said circular path downwardly against the inner side wall surface of the can, said last mentioned means including a cutter wheel rotatably mounted on said head at a location spaced radially from the axis of rotation of said shaft to roll along said circular path and to penetrate the can top as the head is rotated and advanced axially toward the can top, and at least one member mounted on said head at a location spaced angularly from said cutter wheel and acting radially outward against the marginal cut portion of the can outside of said circular path as said head is advanced axially after severance of the can top.

4. A can opener according to claim 3; wherein the last mentioned means includes a cutter wheel rotatably mounted on said head at a location spaced radially from the axis of rotation of said shaft to roll along said circular path and to penetrate the can top as the head is rotated and advanced axially toward the can top, a resiliently mounted button on said head at a location spaced angularly from said cutter wheel and operative to act radially outward and downwardly against said marginal cut portion of the can top as the rotation and axial advancement of the head is continued after severance of the can top, thereby to begin the downward folding of the marginal cut portion of the can, and a crimping wheel rotatably mounted on said head at a location diametrically opposed to that of said button and acting radially outward against the marginal cut portion after the downward folding of the latter has been begun by said button and while the latter continues in engagement with the marginal cut portion so that radially outward pressure of said crimping wheel against said marginal cut portion is ensured to complete the downward folding of the latter against the inner side wall surface of the can.

5. A can opener according to claim 3; wherein the last mentioned means includes a cutter wheel rotatably mounted on said head at a location spaced radially from the axis of rotation of said shaft to roll along said circular path and there penetrate the can top as said head is rotated and advanced axially toward the can top, and a stabilizing wheel rotatably mounted on said head at a location diametrically opposed to that of said cutter wheel and disposed closer to said axis of the shaft than said cutter wheel so that, as the latter penetrates the can top, said stabilizing wheel rolls along the can top radially inside of said circular path to prevent tilting of the severed portion of the can top in response to the action of said cutter wheel.

6. A can opener according to claim 5; wherein said last mentioned means further includes a resiliently mounted button on said head at a location spaced angularly from said cutter wheel and operative to act radially outward and downwardly against said marginal cut portion of the can top as the rotation and axial advancement of the head is continued after severance of the can top, thereby to begin the downward folding of the marginal cut portion of the can, and a crimping wheel rotatably mounted on said head at a location diametrically opposed to that of said button and acting radially outward against the marginal cut portion after the downward folding of the latter has been begun by said button and while the latter continues in engagement with the marginal cut portion so that radially outward pressure of said crimping wheel against said marginal cut portion is ensured to complete the downward folding of the latter against the inner side wall surface of the can.

7. A can opener according to claim 3; wherein the last mentioned means includes a cutter wheel rotatably mounted on said head at a location spaced radially from the axis of rotation of said shaft to roll along said circular path and to there penetrate the can top as said head is rotated and advanced axially toward the can top, and two buttons mounted resiliently on said head at diametrically opposed locations spaced angularly from the locations of said cutter wheel and simultaneously operative, after said cutter wheel has penetrated the can top, to act radially outward and downwardly against the marginal cut portion of the can as said rotation and axial advance of the head is continued thereby to fold the marginal cut portion downwardly against the inner side wall surface of the can.

8. A can opener comprising a downwardly opening, diametrically split housing adapted to embrace and extend over the top of a can to be opened; and an assembly including an internally threaded hub adapted to be carried by said housing at a central location, a threaded shaft extending through said hub to advance axially toward and away from the top of a can embraced by said housing in response to rotation of said shaft in opposite directions, a cross-bar mounted on the end of said shaft within the housing and free to rotate relative to said shaft, and pointed pins depending from the opposite ends of said cross-bar to puncture the top of the can as said shaft is rotated in the direction advancing it toward the can top, so that said housing serves to contain any of the contents of the can that may be sprayed from the latter when the can top is punctured.

9. A can opener comprising a downwardly opening, diametrically split housing including two semi-cylindrical roofed portions hingedly connected at one side for swinging between an angularly spaced apart released position and a closed position, wherein said portions are abutting to embrace and extend over the top of a can received in the housing, said housing further having an inwardly directed rim along its lower edge to engage under the rim at the top of a can embraced by the housing and inwardly directed projections immediately above said rim of the housing to grip the can rim and prevent rotation of the can when the latter is embraced by said portions in their closed position, the roofs of said semi-cylindrical portions of the housing having complementary semi-circular cut-outs therein registering with each other to define a circular opening in the top of said housing when said portions are in their closed position, an internally threaded hub having an external, peripheral groove to receive the edges of said portions around the semi-circular cut-outs so that said hub is carried by the top of said housing when said portions of the latter are in their closed position, a threaded shaft extending through said hub to advance axially toward and away from the top of a can embraced by said housing in response to rotation of said shaft in opposite directions, and means mounted on said shaft to puncture the can top when said shaft is rotated in the direction advancing the latter toward the can top.

10. A can opener according to claim 9; wherein said means for puncturing the can top includes a head secured to said shaft, and at least one cutter wheel rotatably mounted on said head at a location spaced from the axis of said shaft to roll along a circular path on the top of a can embraced by the housing and to there sever the can top as said shaft is rotated in said direction advancing said shaft and head toward the can top.

11. A can opener according to claim 9; wherein said means for puncturing the can top includes a cross-bar mounted on said shaft for rotation relative to the latter, and pointed pins depending from the opposite ends of said cross-bar to puncture the can top at diametrically spaced locations as said shaft is rotated in said direction advancing the shaft and cross-bar toward the can top.

12. A can opener according to claim 9; further comprising a tapered pin extending radially from said hub within said groove of the latter, one of said portions of the housing having a bore in the roof thereof opening at the edge of the related semi-circular cut-out to receive said tapered pin, whereby said hub is removably held in connection with said one portion of the housing when said portions are in their released position.

13. A can opener according to claim 9; wherein said housing has an internal, annular shoulder facing upwardly at a level above said rim of the housing; and said means for puncturing the can top includes a cross-bar secured to the lower end of said shaft and having downwardly extending opposite ends, cutter wheels rotatably mounted on the inner sides of said downwardly extending ends to roll along a circular path on the can top and there penetrate the latter as said shaft is rotated in the direction advancing it axially toward the can top, said downwardly extending ends of the cross-bar being dimensioned to radially overlie said shoulder of the housing so that engagement of said downwardly extending ends with said shoulder limits the axial advancement of said shaft in the direction toward the can top.

References Cited in the file of this patent

UNITED STATES PATENTS

| 140,604 | Wood | July 8, 1873 |
| 369,108 | Hammer | Aug. 30, 1887 |
| 1,018,266 | Polakovich | Feb. 20, 1912 |
| 1,301,875 | Prosser | Apr. 29, 1919 |
| 2,176,714 | Hoppenstand | Oct. 17, 1939 |
| 2,265,491 | Powers | Dec. 9, 1941 |

FOREIGN PATENTS

| 662,349 | France | Aug. 6, 1929 |